US012568092B2

(12) United States Patent
Neipris et al.

(10) Patent No.: US 12,568,092 B2
(45) Date of Patent: Mar. 3, 2026

(54) SYSTEM AND METHOD FOR PROVIDING SECURE NETWORK ACCESS TO NETWORK-ENABLED DEVICES

(71) Applicant: 5321 Innovation Labs LLC, Franklin, MA (US)

(72) Inventors: Edward W. Neipris, Wrentham, MA (US); Gaurav Jain, Moorpark, CA (US); Tyler Nesper, Denver, CO (US)

(73) Assignee: 5321 INNOVATION LABS LLC, Franklin, MA (US)

( * ) Notice: Subject to any disclaimer, the term of this patent is extended or adjusted under 35 U.S.C. 154(b) by 243 days.

(21) Appl. No.: 18/338,230

(22) Filed: Jun. 20, 2023

(65) Prior Publication Data

US 2023/0412613 A1 Dec. 21, 2023

Related U.S. Application Data

(60) Provisional application No. 63/366,745, filed on Jun. 21, 2022.

(51) Int. Cl.
| | |
|---|---|
| *H04L 9/40* | (2022.01) |
| *H04L 12/46* | (2006.01) |
| *H04L 41/0893* | (2022.01) |
| *H04L 41/0894* | (2022.01) |
| *H04L 67/02* | (2022.01) |
| *H04L 67/306* | (2022.01) |
| *H04W 12/06* | (2021.01) |
| *H04W 12/50* | (2021.01) |

(52) U.S. Cl.
CPC ........ *H04L 63/107* (2013.01); *H04L 12/4641* (2013.01); *H04L 12/4675* (2013.01); *H04L 63/102* (2013.01); *H04L 41/0893* (2013.01); *H04L 41/0894* (2022.05); *H04L 67/02* (2013.01); *H04L 67/306* (2013.01); *H04W 12/06* (2013.01); *H04W 12/50* (2021.01)

(58) Field of Classification Search
None
See application file for complete search history.

(56) References Cited

U.S. PATENT DOCUMENTS

| | | | | |
|---|---|---|---|---|
| 9,253,198 | B2 * | 2/2016 | Hughes, Jr. ............. | H04L 63/08 |
| 11,317,281 | B2 * | 4/2022 | Huber ................... | H04W 24/10 |
| 11,317,285 | B2 | 4/2022 | Neipris et al. | |
| 2006/0095780 | A1 * | 5/2006 | Hillis ................... | H04L 63/083 |
| | | | | 713/182 |

(Continued)

*Primary Examiner* — Lashonda Jacobs-Burton

(74) *Attorney, Agent, or Firm* — KRIEGSMAN & KRIEGSMAN

(57) ABSTRACT

A system and corresponding computer-implemented method provide secure network access to network-enabled devices. The computer-implemented method creates a user profile, automatically. The user profile is bound to a physical geographic location. The user profile provides access rights to a network. The computer-implemented method assigns, automatically, at least one VLAN to the user profile created. The assigning is based on whether there is an existing user profile bound to the physical geographic location. The computer-implemented method associates, automatically, the user profile created with a network-enabled device. The assigning and associating provide the network-enabled device with secure network access to the network.

19 Claims, 6 Drawing Sheets

(56) References Cited

U.S. PATENT DOCUMENTS

| | | | | |
|---|---|---|---|---|
| 2007/0011725 A1* | 1/2007 | Sahay | .................. | H04L 63/102 |
| | | | | 726/4 |
| 2011/0080915 A1* | 4/2011 | Baykal | ................. | H04L 47/125 |
| | | | | 370/395.53 |
| 2011/0225286 A1* | 9/2011 | Francis | .................. | H04L 41/50 |
| | | | | 709/224 |
| 2012/0257502 A1* | 10/2012 | Le Sage | ............... | H04L 47/125 |
| | | | | 370/235 |
| 2013/0305320 A1* | 11/2013 | Warrick | ............... | G06F 16/955 |
| | | | | 726/4 |
| 2014/0245395 A1* | 8/2014 | Hulse | ................. | H04W 12/068 |
| | | | | 726/4 |
| 2015/0281277 A1* | 10/2015 | May | ....................... | H04L 63/10 |
| | | | | 726/1 |
| 2017/0150362 A1* | 5/2017 | Clemenson | ......... | H04L 41/0806 |
| 2022/0272089 A1* | 8/2022 | Mohammed | ............ | H04L 63/20 |
| 2023/0085382 A1* | 3/2023 | Saini | ....................... | H04L 63/20 |
| | | | | 726/26 |
| 2024/0121609 A1* | 4/2024 | Neipris | ................ | H04L 63/108 |

* cited by examiner

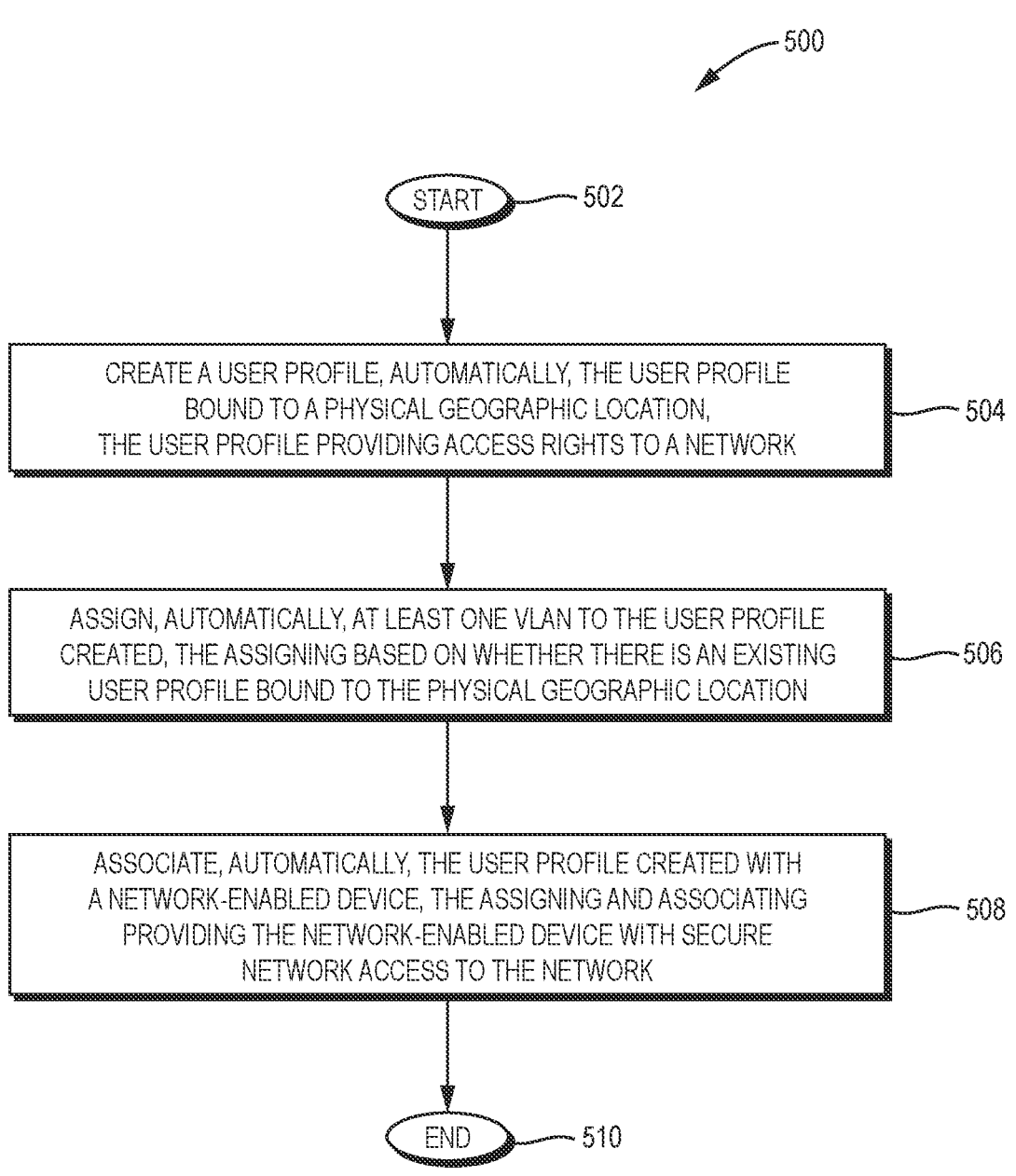

500

START — 502

CREATE A USER PROFILE, AUTOMATICALLY, THE USER PROFILE
BOUND TO A PHYSICAL GEOGRAPHIC LOCATION,
THE USER PROFILE PROVIDING ACCESS RIGHTS TO A NETWORK — 504

ASSIGN, AUTOMATICALLY, AT LEAST ONE VLAN TO THE USER PROFILE
CREATED, THE ASSIGNING BASED ON WHETHER THERE IS AN EXISTING
USER PROFILE BOUND TO THE PHYSICAL GEOGRAPHIC LOCATION — 506

ASSOCIATE, AUTOMATICALLY, THE USER PROFILE CREATED WITH
A NETWORK-ENABLED DEVICE, THE ASSIGNING AND ASSOCIATING
PROVIDING THE NETWORK-ENABLED DEVICE WITH SECURE
NETWORK ACCESS TO THE NETWORK — 508

END — 510

FIG. 5

SYSTEM AND METHOD FOR PROVIDING SECURE NETWORK ACCESS TO NETWORK-ENABLED DEVICES

RELATED APPLICATION

This application claims the benefit of U.S. Provisional Application No. 63/366,745, filed on Jun. 21, 2022. The entire teachings of the above application are incorporated herein by reference.

BACKGROUND

There are instances in which network-enabled device users are assigned access rights to a network by way of a user profile. This rights assignment may include rights to a network segregated Virtual Local Area Network (VLAN) designated for use as a Personal Area Network (PAN). Such instances include, but are not limited to, an apartment lessee or resident who wishes to access a property-provided network to gain access to the Internet. This resident may be assigned a VLAN designated as a PAN to isolate their devices from being accessed by neighbors or other network users, while still allowing the resident to communicate to other devices within the PAN. Another example may be a hotel guest wishing to access the Internet and property-provided devices, such as an Internet of Things (IoT) device for non-limiting example. By utilizing PAN methodology, the hotel guest's device(s) may be isolated from other hotel guests' devices, while having access to the IoT device(s) within the same PAN.

SUMMARY

According to an example embodiment, a computer-implemented method for providing secure network access to network-enabled devices comprises creating a user profile, automatically. The user profile is bound to a physical geographic location. The user profile provides access rights to a network. The computer-implemented method further comprises assigning, automatically, at least one VLAN to the user profile created. The assigning is based on whether there is an existing user profile bound to the physical geographic location. The computer-implemented method further comprises associating, automatically, the user profile created with a network-enabled device. The assigning and associating provide the network-enabled device with secure network access to the network.

The physical geographic location may be associated with a given VLAN, designated as a personal area network (PAN). In an event there is no existing user profile bound to the physical geographic location, the computer-implemented method may further comprise assigning the given VLAN to the user profile created.

The network-enabled device may be a type of device that offers an authentication method via a user interface (UI) or a headless computing device (HCD) that operates without a respective UI and does not offer a respective authentication method. In an event there is an existing user profile bound to the physical geographic location, the existing user profile may have a first VLAN assigned thereto and the at least one VLAN, assigned to the user profile created, may include at least one second VLAN, the at least one second VLAN being different from the first VLAN.

The assigning of the at least one VLAN to the user profile created may include associating the at least one VLAN with a media access control (MAC) address of the network-enabled device, embedded identity document (EID) corresponding to an embedded subscriber identity module (eSIM) of the network-enabled device, or other unique identifier of the network-enabled device.

The computer-implemented method may further comprise instructing infrastructure equipment to accept a request for the network-enabled device to attach to the network and providing a VLAN of the at least one VLAN to the infrastructure equipment.

The computer-implemented method may further comprise providing attributes to the infrastructure equipment. The attributes may include a bandwidth restriction, data usage restriction, session-timeout information, other attribute, or a combination thereof.

The physical geographic location may be associated with a given VLAN, designated as a PAN. The VLAN provided may be the given VLAN in an event (i) the network-enabled device has no user profile association prior to the associating and (ii) there is only one user profile bound to the physical geographic location. Alternatively, in an event a) the network-enabled device has no user profile association prior to the associating and b) there is more than one user profile bound to the physical geographic location, the VLAN provided may be the second VLAN, the second VLAN being different from the first VLAN.

The computer-implemented method may further comprise identifying a source location of the access request, wherein the source location is the physical geographic location, and allowing or denying the network-enabled device access to the network based on at least one user profile policy associated with the user profile created and at least one physical geographic location policy associated with the physical geographic location. The identifying and allowing may enable roaming of the network-enabled device across a plurality of network with secure network access. The plurality of networks may include the network.

According to another example embodiment, a system for providing secure network access to network-enabled devices comprises at least one processor and at least one memory. The at least one memory has encoded thereon a sequence of instructions which, when loaded and executed by the at least one processor, causes the at least one processor to create a user profile, automatically. The user profile is bound to a physical geographic location. The user profile provides access rights to a network. The sequence of instructions further causes the at least one processor to assign, automatically, at least one VLAN to the user profile created. The assigning is based on whether there is an existing user profile bound to the physical geographic location. The sequence of instructions further causes the at least one processor to associate, automatically, the user profile created with a network-enabled device. The assigning and associating provide the network-enabled device with secure network access to the network.

The system may be a cloud-based authentication system.

Alternative system embodiments parallel those described above in connection with the example computer-implemented method embodiment.

According to another example embodiment, a non-transitory computer-readable medium for providing secure network access to network-enabled devices has encoded thereon a sequence of instructions which, when loaded and executed by at least one processor, causes the at least one processor to create a user profile, automatically. The user profile is bound to a physical geographic location. The user profile provides access rights to a network. The sequence of instructions further causes the at least one processor to assign, automatically, at least one VLAN to the user profile created. The assigning is based on whether there is an existing user profile bound to the physical geographic location. The sequence of instructions further causes the at least one processor to associate, automatically, the user profile created with a network-enabled device. The assigning and associating provide the network-enabled device with secure network access to the network.

Alternative non-transitory computer-readable medium embodiments parallel those described above in connection with the example computer-implemented method embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 5 is a flow diagram of an example embodiment of another computer-implemented method for providing secure network access to network-enabled devices.

DETAILED DESCRIPTION

Figure 1:
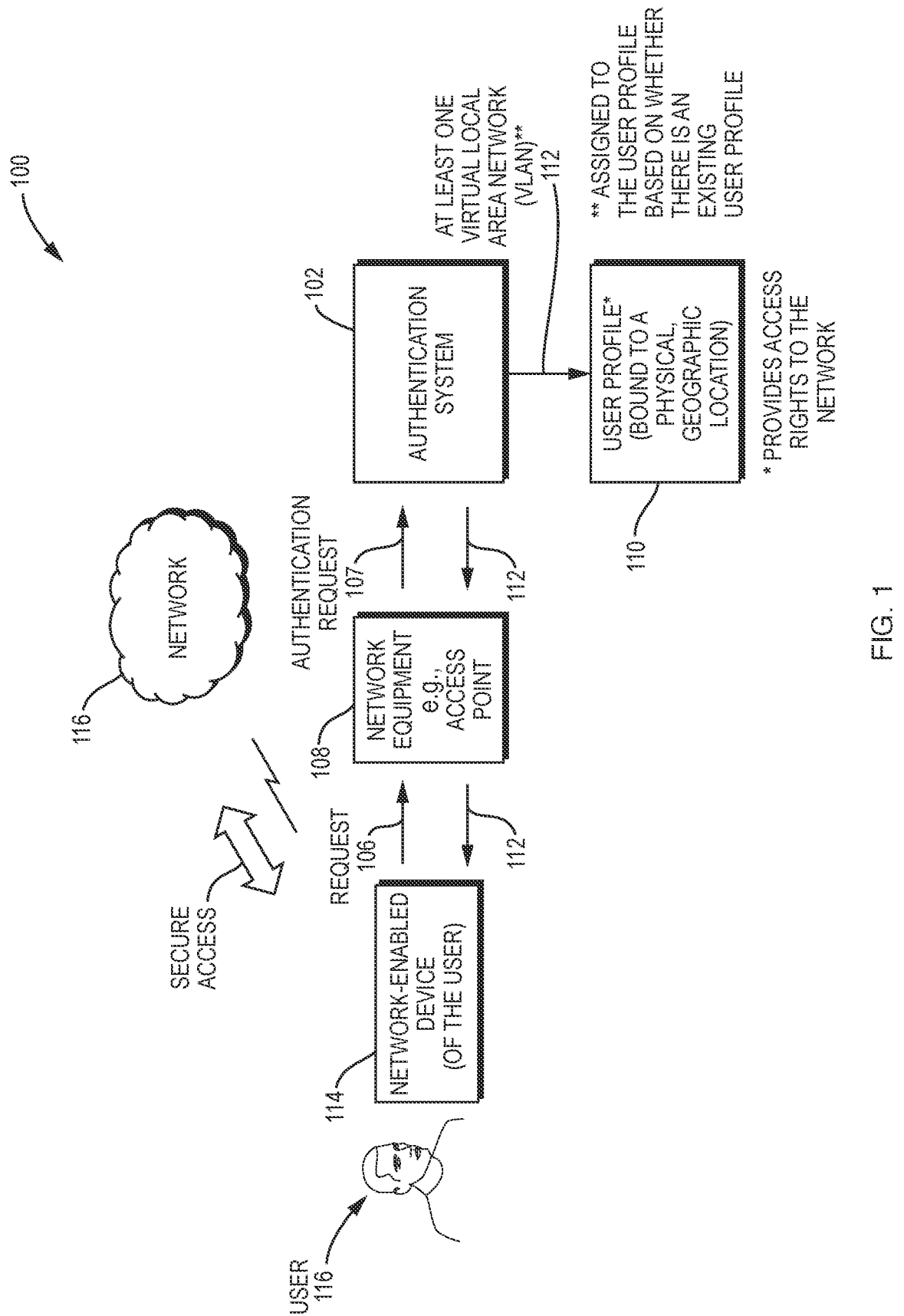
FIG. 1 is a block diagram of an example embodiment of a computing environment.

A description of example embodiments follows.

While an example embodiment disclosed herein may refer to a network-enabled device as a headless computing device (HCD), defined further below, it should be understood that such example embodiment is not limited to the network-enabled device being a HCD.

A "unit," as referred to in the present disclosure, may be a property, such as an apartment unit/complex, hotel, or other property for non-limiting examples. Such a property may provide a network and may be referred to herein as a physical geographic location.

A dynamic virtual local area network (VLAN) configuration process (DVCP) referred to herein may be implemented as disclosed in the co-pending U.S. patent application entitled "System and Method for Virtual Local Area Network (VLAN) Assignment," filed concurrently herewith, the entire teachings of which are incorporated herein by reference.

Personal Area Network (PAN) isolation is generally accomplished by pre-associating a credential with a user profile. This credential could be, but is not limited to, a username/password combination, a wireless pre-shared key (PSK), a certificate, a media access control (MAC) address, or a specific port on a piece of infrastructure equipment. A VLAN or PAN assignment is, generally, a static assignment in which a geographic location is preconfigured with a predesignated VLAN. For instance, an apartment unit could be assigned a specific VLAN or PAN. When a lessee chooses to access the property provided network, a user profile of the lessee would assign the lessee the same VLAN that is assigned to the apartment unit.

There are instances in which two, or more, disparate users may be assigned to the same PAN by way of user profile. These instances include, but are not be limited to, an apartment lessee or resident that has a user profile which allows network access extended to the end of a month; however, their lease expires in the middle of the month. A new lessee or resident taking possession of the apartment unit in the middle of the month would be assigned the same PAN as the existing resident.

This condition would pose a data security risk for both residents, as their devices would be assigned to the same PAN. In this situation, devices connected to the network from either user would have the ability to access data from any device within the PAN, irrespective of which user the devices belong to. Such a condition may be referred to herein as antagonistic as such configuration does not provide secure access.

Described herein is a unique process to provide secure network access to network-enabled devices in instances where disparate users and/or devices are competing for access to the same VLAN. A by-product of this process provides device roaming across a multitude of networks, whether local or geographically dispersed.

There are currently mechanisms that are designed to alleviate, but not solve, the challenge described. These mechanisms include the use of Dynamic VLAN Assignment, 802.1x MAC authentication, and a manual process for associating network-enabled devices to a user profile, as described below.

Dynamic VLAN Assignment:

Dynamic VLAN assignment provides a means for a user profile to be assigned to an unknown and currently unused VLAN. When a device is authorized on a network, a system may check to see if a VLAN, static or dynamic, has been assigned to the user profile and, if not, the system may check to see what VLANs are currently not in use by any other user profile and assign that unused VLAN to the user profile.

802.1x Authentication:

802.1x is a port-based authentication mechanism used to prevent unauthorized devices from gaining access to a network. There are three main components utilized in an 802.1x exchange, namely a Supplicant, and Authenticator, and an Authentication Server. The Supplicant is a network-enabled device which collects authentication credentials from an end user and forwards those authentication credentials for authentication purposes. The Authenticator is a network-enabled access device which collects the credentials from the Supplicant and forwards same to an Authentication Server. Credentials may be supplied from the Supplicant anonymously via MAC-Bypass, as is known in the art. This method allows the MAC address of the network-enabled device to be forwarded to the Authentication Server to validate access. The Authentication Server validates the credentials and allows or denies access to the network-enabled device based on the validity of the supplied credentials.

Manual Device Association:

To utilize 802.1x and Dynamic VLAN Assignment, the devices connecting to the network are pre-known to the Authentication System. This knowledge can come in the form of a system-provided credential. This credential could be, but is not be limited to, a username/password combination, a wireless PSK, or a certificate. This poses a challenge on devices that have no mechanisms for providing these credentials, such as disclosed in U.S. Pat. No. 11,317,285, filed on Sep. 30, 2020, entitled "Wireless Network Provisioning Using a Pre-Shared Key," the entire teachings of which are incorporated herein by reference. Such devices may be referred to herein as headless computing devices (HCDs). A headless computing device (HCD) may be a network-enabled device that operates without a user interface. These devices may include, but are not limited to, printers, IoT devices, or other headless computing devices. For the purposes of clarity, such devices may be identified herein as HCDs.

For such devices to gain secure network connectivity, 802.1x MAC-Bypass is generally used. However, if these devices have not been previously associated with a user profile, access may be denied, limited, or obtained based on being placed in an unsecure VLAN commonly identified as a "Guest" network.

The current methods of associating these devices to a user profile include interrupting a connection and denying access until the device is associated. This may be done with Captive Portal, a system-provided user interface to enter MAC addresses, or by initiating a support ticket with a network vendor to associate the device to a user profile. In any of these cases, the user must be able to provide the MAC address of the device trying to connect. This is challenging as, in many cases, these devices make it difficult to find the MAC address, or worse, will change MAC addresses during connection requests.

Novel and Unique Approach to Providing Antagonistic Network Access and Device Roaming:

An example embodiment of a new system and method disclosed herein utilizes common data storage techniques coupled with standards-based communication protocols to create a process that addresses the disadvantages of the current methods, such as the current methods described above for non-limiting examples. An example embodiment disclosed herein provides a mechanism to allow two or more user profiles to be assigned to a same, geographically-assigned network access location. In addition, as an example embodiment of an authentication system disclosed below may be cloud based, network access policies may be applied globally to enable roaming of devices that would otherwise be bound, statically. An example embodiment of new method and system disclosed herein creates a better, more secure, and uninterrupted network access experience for a user relative to current methods, while providing positive benefits of such current methods. An example embodiment of such a system is disclosed below with regard to FIG. 1.

FIG. 1 is a block diagram of an example embodiment of a computing environment 100. The computing environment 100 includes an authentication system 102 for providing secure network access to network-enabled devices. In the computing environment 100, a user 104 may request 106 or be provided network access. There are many methods that enable such a transaction to occur. Such methods may include, but are not limited to, the purchase of a service by the user 104 through a web-based sign-up process, the assignment of service from a network administrator, or being issued service as an amenity. The request 106 may be sent as an authentication request 107 to the authentication system 102 via network equipment 108, such as an access point for non-limiting example. When the request 106 is approved, the authentication system 102 may be configured to create a user profile 110 for the user 104. The user profile 110 may include attributes such as, but not limited to, assigned network access speed, time of day restrictions, length of access restrictions, or number of allowed device restrictions.

As part of the creation of the user profile 110, the authentication system 102 may be configured to identify if the user profile 110 is bound to a physical geographic location (not shown), such as an apartment unit for non-limiting example. If the user profile 110 is bound, the authentication system 102 may be configured to check to see if there is a pre-existing user profile (not shown) that is bound to the same physical geographic location. If there is no pre-existing user profile bound to this location, the authentication system 102 may be configured to assign the user profile 110 to at least one VLAN 112. The at least one VLAN 112 may include a VLAN, designated as a PAN, assigned to the physical geographic location. For the purposes of clarity, such user profile may be identified as User-A throughout the remainder of this disclosure.

If there is a pre-existing user profile bound to the same physical geographic location, the authentication system 102 may be configured to use a Dynamic VLAN Assignment method, such as disclosed above, or DVCP, to assign two currently unused VLANs to the new user profile, that is, the user profile 110 created. The first of these VLANs may be defined for use with devices that offer an authentication method, such as username/password combination for non-limiting example, and the second (or wired) VLAN may be defined for HCDs. For the purposes of clarity, such user profile may be identified as User-N (or User-B) throughout the remainder of this disclosure.

When User-A attaches a network-enabled device 114, such as a headless computing device (HCD) to the network 116 for non-limiting example, an 802.1x authentication request (not shown) may be sent from connecting infrastructure equipment, such as the network equipment 108 or other infrastructure equipment (not shown), to the authentication system 102. The authentication system 102 may be configured to check to see if the HCD is associated with any existing user profile. If the HCD is associated with an existing user profile, the authentication system 102 may be configured to inform the infrastructure equipment to accept the connection and provide the VLAN which is associated with such user profile. The authentication system 102 may be configured to provide other attributes to the infrastructure equipment, such as bandwidth restrictions, data usage restrictions, or session-timeout information for non-limiting examples. This will place the HCD in the VLAN, designated as a PAN, associated with the corresponding user profile.

If the HCD is not currently associated with an existing user profile, the authentication system 102 may be configured to check to see if there is more than one user profile associated with the physical geographic location access is being requested from. If there is only one user profile associated with the physical geographic location, the authentication system 102 may be configured to inform the infrastructure equipment to accept the connection and provide the VLAN which is associated with the physical geographic location in which the HCD is connecting. The authentication system 102 may be configured to provide other attributes to the infrastructure equipment, such as bandwidth restrictions, data usage restrictions, or session-timeout information for non-limiting examples. This will place the HCD in the VLAN, designated as a PAN, associated with the corresponding physical geographic location. Once access has been granted, the authentication system 102 may be configured to assign the HCD to the User-A user profile, that is, the user profile 110 created. This assignment could be, but is not limited to, the MAC address of the HCD or any uniquely identifiable data sent from the HCD that may be used for future authentications.

If the HCD is not currently associated with an existing user profile, and there is more than one user profile associated with the physical geographic location, the authentication system 102 may be configured to inform the infrastructure equipment to accept the connection and provide the VLAN which is associated with the User-N user profile second (or wired) VLAN. The authentication system 102 may be configured to provide other attributes to the infrastructure equipment, such as bandwidth restrictions, data usage restrictions, or session-timeout information, for non-limiting examples. This will place the HCD in the VLAN, designated as a PAN, associated with the User-N user profile second (or wired) VLAN. The authentication system 102 may be configured such that is does not automatically associate this HCD with any user profile but applies the policies associated with the User-N user profile.

The authentication system 102 may comprise at least one processor (not shown) and at least one memory (not shown), such as the central processor unit (CPU) 666 and memory 658 of FIG. 6, respectively, disclosed further below for non-limiting example. With reference back to FIG. 1, the at least one memory has encoded thereon a sequence of instructions (not shown) which, when loaded and executed by the at least one processor, causes the at least one processor to create the user profile 110, automatically. The user profile 110 is bound to a physical geographic location and provides access rights to the network 116, as disclosed above. The sequence of instructions may further cause the at least one processor to assign, automatically, the at least one VLAN 112 to the user profile 110 created. The is assigning based on whether there is an existing user profile bound to the physical geographic location, as disclosed above. The sequence of instructions may further cause the at least one processor to associate, automatically, the user profile 110 created with the network-enabled device 114. The assigning and associating provide the network-enabled device 114 with secure network access to the network 116, as disclosed above. The sequence of instructions may further cause the at least one processor to implement the methods of FIGS. 2, 3A, 3B, 4, and 5, disclosed below.

Figure 2:
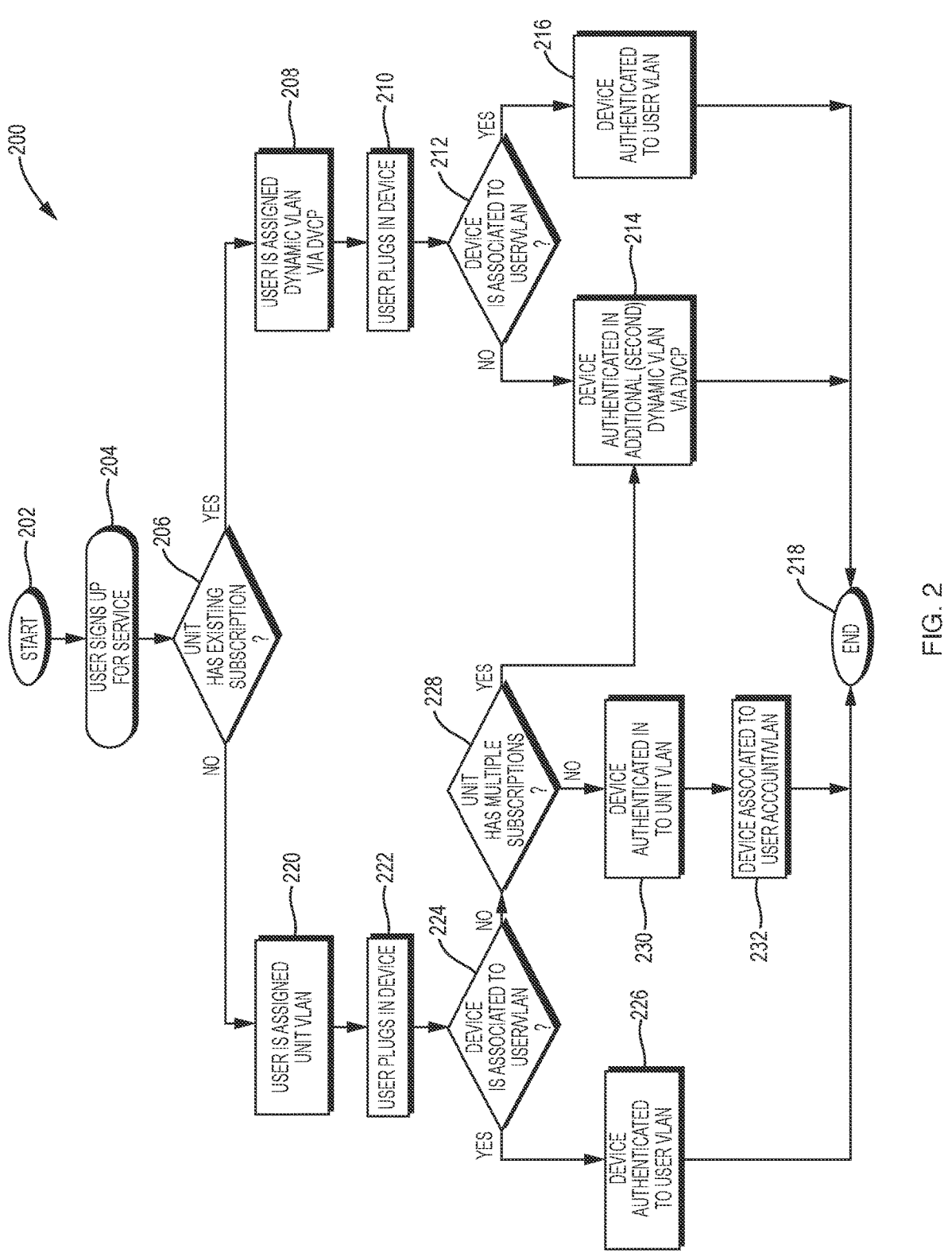
FIG. 2 is a flow diagram of an example embodiment of a computer-implemented method for providing secure network access to network-enabled devices.

FIG. 2 is a flow diagram of an example embodiment of a computer-implemented method (200) for providing secure network access to network-enabled devices. The computer-implemented method begins (202) and, in response to a user signing-up for a service to access a network of a unit (204), comprises checking (206) for whether a unit has an existing subscription for the user. If yes, the computer-implemented method may comprise assigning the user to a first dynamic VLAN via DVCP (208). In response to the user plugging in (e.g., connecting or attaching) a network-enabled device (210) to a network of the unit, the computer-implemented method may comprise checking (212) for whether the network-enabled device is associated with a user/VLAN. If yes, the computer-implemented method may comprise authenticating the network-enabled device to the user VLAN (216) and the computer-implemented method thereafter ends (218) in the example embodiment.

If, however, the network-enabled device is not associated with a user/VLAN based on the checking (212), the computer implemented method may comprise authenticating the network-enabled device to a second dynamic VLAN via DVCP (214) and the computer-implemented method thereafter ends (218) in the example embodiment.

If, however, it is determined that the unit does not have an existing subscription for the user, based on the checking (206), the computer-implemented method may comprise assigning the user to the unit VLAN (220), that is, a VLAN of the unit. In response to the user plugging in the network-enabled device to the network (222), the computer-implemented method may comprise checking (224) for whether the network-enabled device is associated with the user/VLAN. If no, the computer-implemented method may comprise authenticating the network-enabled device to the user VLAN (226) and the computer-implemented method thereafter ends (218) in the example embodiment.

If, however, it is determined that the network-enabled device is not associated with the user/VLAN based on the checking (224), the computer-implemented method may comprise checking (228) for whether the unit has multiple subscriptions. If yes, the computer-implemented method may comprise authenticating the network-enabled device to a second dynamic VLAN via DVCP (214) and the computer-implemented method thereafter ends (218) in the example embodiment.

If, however, it is determined that the unit does not have multiple subscriptions based on the checking (228), the computer-implemented method may comprise authenticating the network-enabled device in to the unit VLAN (230) and associating the network-enabled device with the user account/VLAN (232). The computer-implemented method thereafter ends (218) in the example embodiment.

Support:

While the following nay be described with regard to a HCD, it should be understood that such disclosure is not limited to a HCD, as noted above, and may be directed to another type of network-enabled device.

There are times in which a HCD has been assigned to User-N second VLAN and a user wishes to associate it directly with a user profile. In these instances, the system may be configured to provide a mechanism that would allow a user of the system to associate the HCD to a specific user profile. This mechanism could be, but is not be limited to, a web-based interface in which a user could log in to a specific user profile, select an Associate Device or Add Device action, and then enter HCD uniquely identifiable data that could include, but is not limited to, the MAC address of the HCD or any uniquely identifiable data sent from the HCD that may be used for future authentications.

There are times in which a HCD may be associated with a specific user profile and a user of the system may want to dissociate the HCD from the specific user profile. In these instances, the system may be configured to provide for a mechanism that allows a user of the system to remove this association. This mechanism could be, but is not limited to, a web-based interface in which a user could log in to a specific user profile, select the HCD in question, and remove the association. Example embodiments of computer-implemented methods that enable a HCD device to be associated and dissociated with a user profile, as disclosed above, are disclosed below with regard to FIG. 3A and FIG. 3B, respectively.

Figures 3A, 3B:
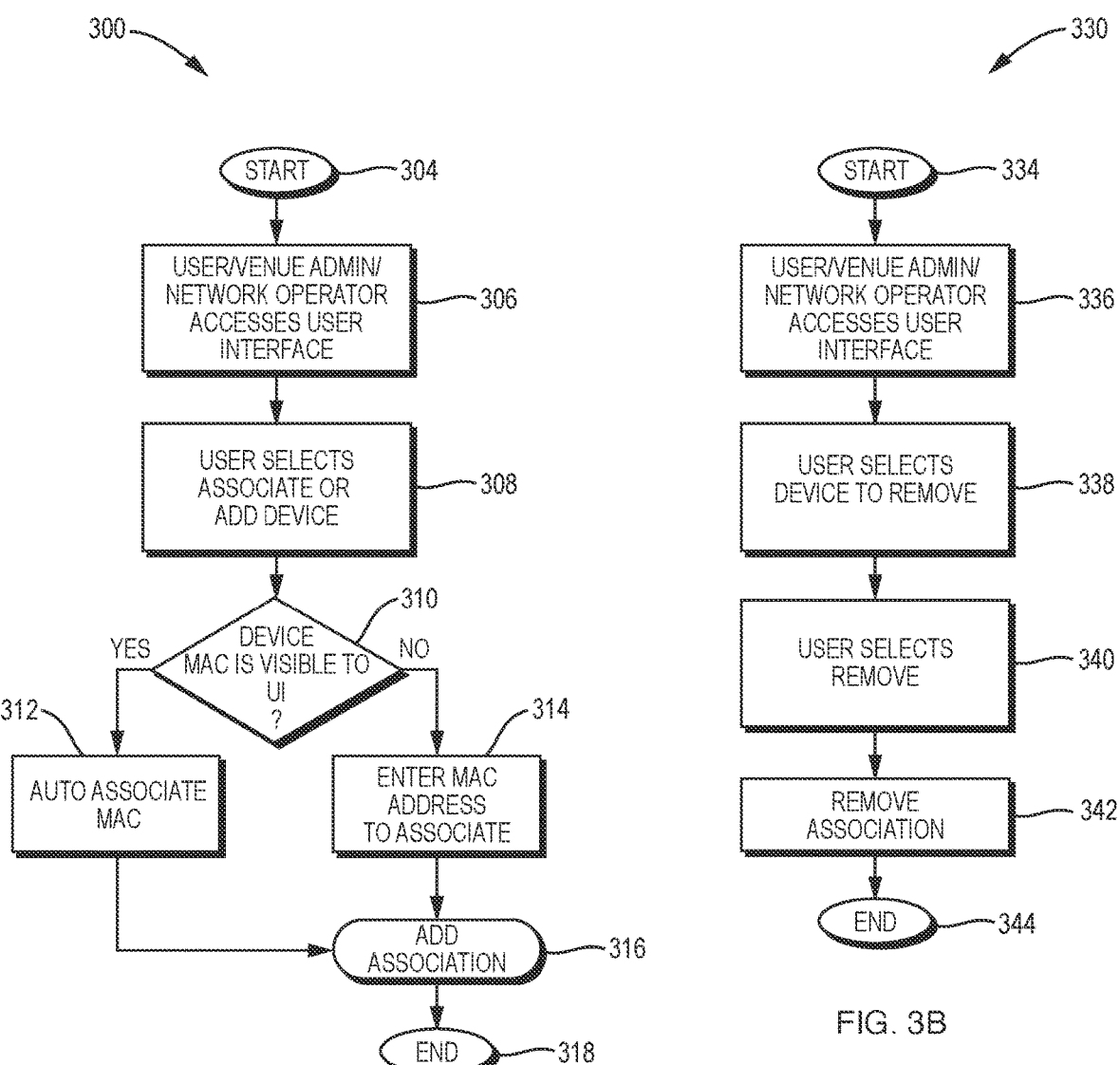
FIG. 3A is a flow diagram of an example embodiment of a computer-implemented method for associating a network-enabled device with a user profile.
FIG. 3B is a flow diagram of an example embodiment of a computer-implemented method for removing an association between a network-enabled device and a user profile.

FIG. 3A is a flow diagram 300 of an example embodiment of a computer-implemented method for associating a network-enabled device with a user profile. The computer implemented method begins (304) and, in response to a user, such as a venue administrator or network operator for non-limiting example, accessing a user interface (UI) (306) and selecting an associate action or add device action (306), the computer-implemented method may comprise checking (310) for whether a MAC address of the network-enabled device is visible to the UI. If yes, the computer-implemented method may comprise associating the MAC address with the user profile automatically (312). The computer-implemented method may comprise adding an association between the network-enabled device and user profile (316) and the computer-implemented method thereafter ends (318) in the example embodiment.

If, however, the MAC address of the network-enabled device is not visible to the UI, the computer-implemented method may comprise entering the MAC address to associate the network-enabled device with the user profile (314) and the computer-implemented method may comprise adding an association between the network-enabled device and user profile (316). The computer-implemented method thereafter ends (318) in the example embodiment.

FIG. 3B is a flow diagram 330 of an example embodiment of a computer-implemented method for removing an association between a network-enabled device and a user profile, thereby removing a device association. The computer-implemented method begins (334) and, in response to a user, such as a venue administrator or network operator for non-limiting example, accessing a user interface (UI) (336), selecting a network-enabled device to remove (338), and selecting a remove action (340), the computer-implemented method removes the association between the network-enabled device and the user profile (342). The method thereafter ends (344) in the example embodiment.

Maintenance:

In many cases the existence of multiple user profiles being assigned to a single physical geographic location is a temporary condition. When this condition clears, the system may be configured to provide a mechanism in which to reconcile assigned VLANs and release them back to a Dynamic VLAN pool as currently unused. To perform this function, the system may be notified when this condition clears. The notification could be, but is not be limited to, a timed polling event in which user profiles are polled from the system, a call back when a user profile expires, or a monitoring event when a user or system administrator removes access from a user profile.

Figure 4:
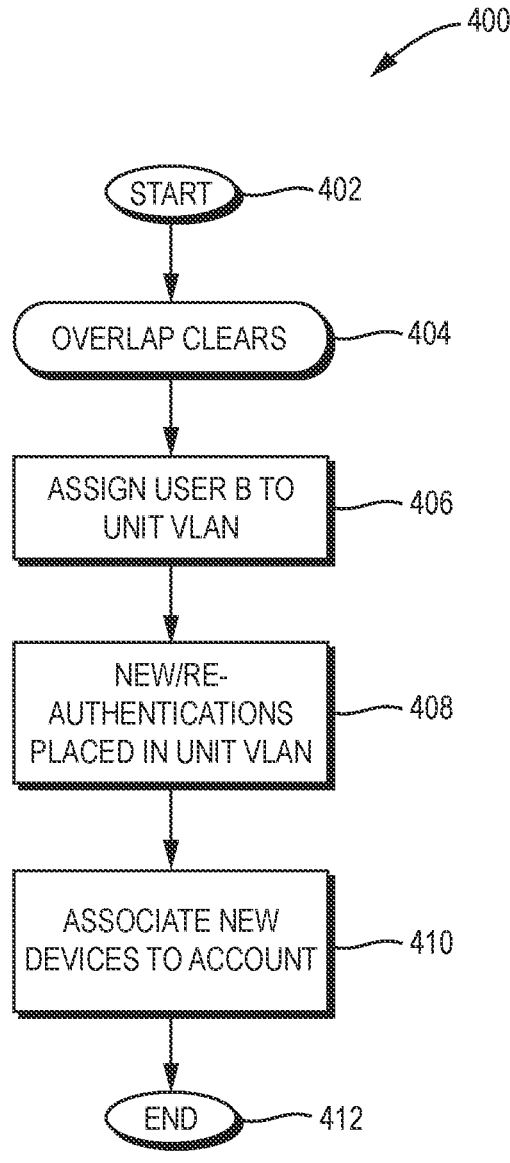
FIG. 4 is a flow diagram of an example embodiment of a computer-implemented method for Virtual Local Area Network (VLAN) maintenance.

When the condition clears, and there is only one user profile left assigned to a physical geographic location, such as a hotel guest room for non-limiting example, the system may be configured to re-associate the User-N user profile to the VLAN that is designated as a PAN and associated with the physical geographic location. At a next authentication of any device to the User-N profile, these devices may be assigned the VLAN now assigned to the User-N profile or subsequently the VLAN associated with the physical geographic location. The next authentication could be caused by, but is not be limited to, a session-timeout, a connection change of authority, or a physical disconnect-reconnect event. FIG. 4, disclosed below, is a flow diagram of a computer-implemented method for such VLAN maintenance disclosed above.

FIG. 4 is a flow diagram of an example embodiment of a computer-implemented method 400 for VLAN maintenance. The computer-implemented method begins (402) and comprises waiting for an overlap condition to clear (404). The overlap condition, that is, the existence of multiple user profiles being assigned to a single physical geographic location, clears and the computer-implemented method further comprises assigning a user to a unit VLAN (406), such as a VLAN or PAN assigned to the single physical geographic location, that may be an apartment unit or hotel for non-limiting examples. The computer-implemented method further comprises performing a new authentication or re-authentication of a network-enabled device of the user placed in the unit VLAN (408). The computer-implemented method further comprises associating new devices to an account of the user (410) and the computer-implemented method thereafter ends (412) in the example embodiment.

Roaming:

Due to the nature of the cloud and the ability to enable an authentication system within the confines of cloud computing, an example embodiment of an authentication mechanism described herein may be configured to provide access accept responses to devices located, physically, anywhere in the world. By sending access requests from local infrastructure to the cloud-enabled authentication system, the system may be configured to perform the same action to identify the physical geographic location of the access request and allow or deny access to a HCD based on user profile policies and physical geographic location policies, as disclosed above.

FIG. 5 is a flow diagram of an example embodiment of a computer-implemented method 500 for providing secure network access to network-enabled devices. The computer-implemented method begins (502) and comprises creating a user profile, automatically, the user profile bound to a physical geographic location, the user profile providing access rights to a network (504). The computer-implemented method further comprises assigning, automatically, at least one VLAN to the user profile created, the assigning based on whether there is an existing user profile bound to the physical geographic location (506). The computer-implemented method further comprises associating, automatically, the user profile created with a network-enabled device, the assigning and associating providing the network-enabled device with secure network access to the network (508). The computer-implemented method thereafter ends (510) in the example embodiment.

Other Use Cases:

As disclosed above, example embodiments of a system and computer-implemented methods provide. secure network access to network-enabled devices. For non-limiting example and with reference back to FIG. 1, the network 116 may be a property-provided network for an apartment complex (not shown) at which the user 104 is renting an apartment (not shown), namely apartment "101," that may be referred to as a physical geographic location. The user 104 may obtain a password for apartment 101 and use that password to allow network-enabled devices of the user 104, such as the network-enabled device 114, to join a VLAN, such as VLAN 101 for apartment 101 for non-limiting example, and gain access to the network 116, enabling the user 104 to access the Internet and other devices of the user 104 in a secure manner.

The user 104 may have paid rent for the apartment 101 through the end of the year. The user 101 may, however, decide to move out of the apartment 101 on December 15, before the end of the year. A new renter (not shown) may move into the apartment 101 on December 15 and sign up for Internet access in the apartment 101. As such, both the user 104 and the new renter are in the VLAN for the apartment 101, namely the VLAN 101. If the user 104 returns to the apartment 101 before the end of year, the user 104 can connect to the network 116 and all devices in the VLAN 101 are visible to each other, thereby presenting an antagonistic condition or security breach. An example embodiment disclosed herein provides secure access in an event of such non-limiting scenario and provides each user, namely the user 104 and the new renter, with secure access the user 104 returning prior the end of the year.

An example embodiment disclosed herein places the new renter into a temporary VLAN, based on identifying a user profile, as disclosed above. The user 104 remains in the VLAN 101 until the end of the year, per the subscription of the user 104. As such, during the overlapping time period during which both the user 104 and the new renter access the apartment 101, both the user 104 and the new renter have secure access to the network 116. In response to the subscription of the user 110 ending at the end of the year, that is, in response to expiration of the subscription of the user 110, the VLAN 110 may be given to the new renter. As such, the network-enabled devices join the original of apartment 110 following expiration of the subscription of the user 104. Such subscription expiration may, for non-limiting example, cause all MAC addresses associated with the user 104 to be removed for any user accounts, profiles, etc.

Figure 6:
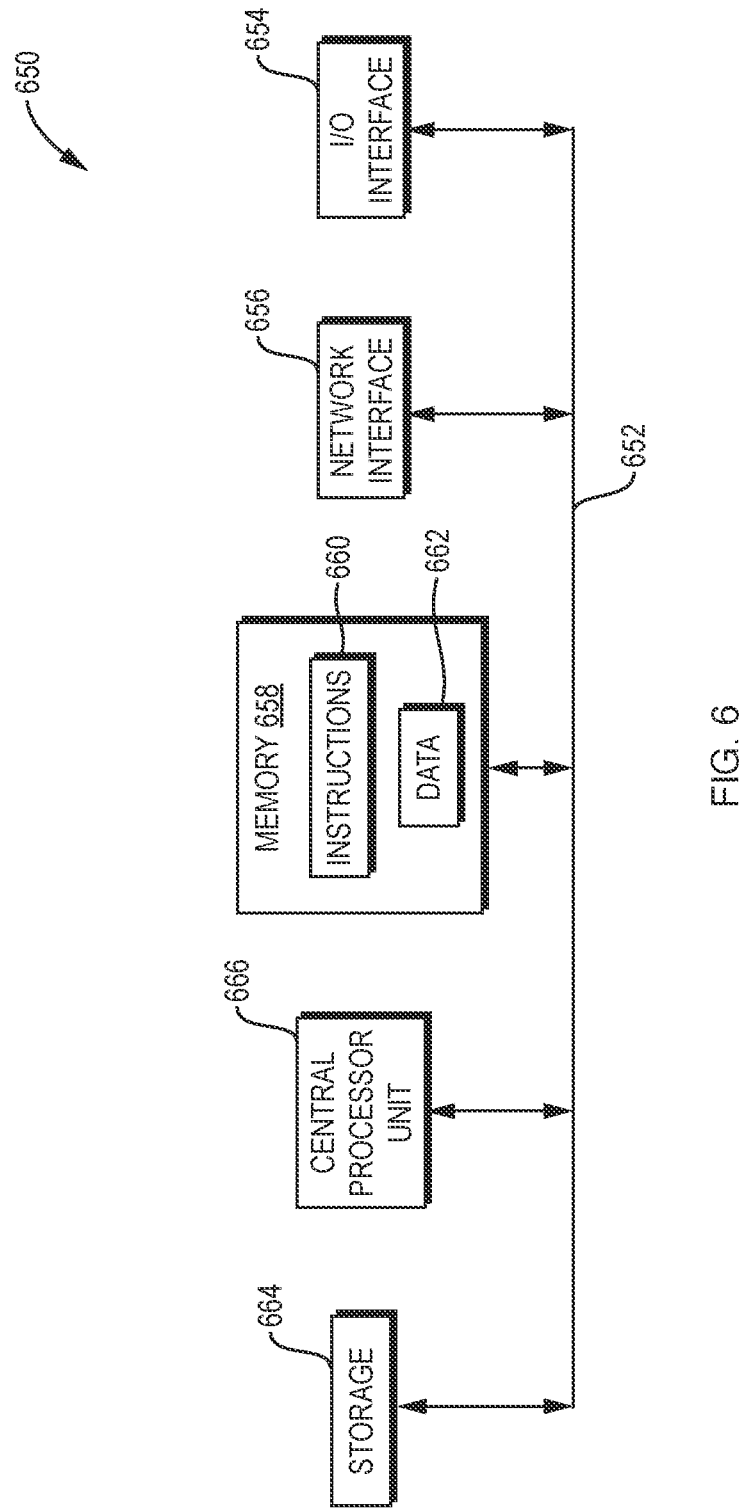
FIG. 6 is a block diagram of an example internal structure of a computer optionally within an embodiment disclosed herein.

FIG. 6 is a block diagram of an example of the internal structure of a computer 650 in which various embodiments of the present disclosure may be implemented. The computer 650 contains a system bus 652, where a bus is a set of hardware lines used for data transfer among the components of a computer or digital processing system. The system bus 652 is essentially a shared conduit that connects different elements of a computer system (e.g., processor, disk storage, memory, input/output ports, network ports, etc.) that enables the transfer of information between the elements. Coupled to the system bus 652 is an I/O device interface 654 for connecting various input and output devices (e.g., keyboard, mouse, displays, printers, speakers, etc.) to the computer 650. A network interface 656 allows the computer 650 to connect to various other devices attached to a network (e.g., global computer network, wide area network, local area network, etc.). Memory 658 provides volatile or non-volatile storage for computer software instructions 660 and data 662 that may be used to implement embodiments (e.g., methods 200, 300, 330, 400, 500) of the present disclosure, where the volatile and non-volatile memories are examples of non-transitory media. Disk storage 564 provides non-volatile storage for computer software instructions 560 and data 562 that may be used to implement embodiments (e.g., methods 200, 300, 330, 400, 500) of the present disclosure. A central processor unit 566 is also coupled to the system bus 552 and provides for the execution of computer instructions.

Example embodiments disclosed herein may be configured using a computer program product; for example, controls may be programmed in software for implementing example embodiments. Further example embodiments may include a non-transitory computer-readable medium that contains instructions that may be executed by a processor, and, when loaded and executed, cause the processor to complete methods described herein. It should be understood that elements of the block and flow diagrams may be implemented in software or hardware, such as via one or more arrangements of circuitry of FIG. 6, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read-only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for providing secure network access to network-enabled devices, the computer-implemented method comprising:

creating a user profile, automatically, the user profile bound to a physical geographic location, the user profile providing access rights to a network segregated into a plurality of Virtual Local Area Networks (VLANs);

exclusively assigning, automatically, at least one Virtual Local Area Network (VLAN) to the user profile created, the assigning based on whether there is an existing user profile bound to the physical geographic location; and associating, automatically, the user profile created with a network-enabled device, the assigning and associating providing the network-enabled device with secure network access to the network.

2. The computer-implemented method of claim 1, wherein the physical geographic location is associated with a given VLAN, designated as a personal area network (PAN), and wherein, in an event there is no existing user profile bound to the physical geographic location, the computer-implemented method further comprises assigning the given VLAN to the user profile created.

3. The computer-implemented method of claim 1, wherein the network-enabled device is a type of device that offers an authentication method via a user interface (UI) or is a headless computing device (HCD) that operates without a respective UI and does not offer a respective authentication method, and wherein, in an event there is an existing user profile bound to the physical geographic location, the existing user profile has a first dynamic VLAN exclusively assigned thereto and the at least one VLAN, assigned to the user profile created, includes at least one second dynamic VLAN, the at least one second dynamic VLAN being different from the first dynamic VLAN.

4. The computer-implemented method of claim 1, wherein assigning the at least one VLAN to the user profile created includes associating the at least one VLAN with a media access control (MAC) address of the network-enabled device, embedded identity document (EID) corresponding to an embedded subscriber identity module (eSIM) of the network-enabled device.

5. The computer-implemented method of claim 1, further comprising instructing infrastructure equipment to accept a request for the network-enabled device to attach to the network and providing a VLAN of the at least one VLAN to the infrastructure equipment.

6. The computer-implemented method of claim 5, further comprising providing attributes to the infrastructure equipment, wherein the attributes include a bandwidth restriction, data usage restriction, session-timeout information, other attribute, or a combination thereof.

7. The computer-implemented method of claim 5, wherein the physical geographic location is associated with a given VLAN, designated as a PAN, and wherein the VLAN provided is the given VLAN in an event (i) the network-enabled device has no user profile association prior to the associating and (ii) there is only one user profile bound to the physical geographic location.

8. The computer-implemented method of claim 5, wherein, in an event there is an existing user profile bound to the physical geographic location, the at least one VLAN assigned includes a first VLAN and a second VLAN, and wherein, in an event a) the network-enabled device has no user profile association prior to the associating and b) there is more than one user profile bound to the physical geographic location, the VLAN provided is the second VLAN, the second VLAN being different from the first VLAN.

9. The computer-implemented method of claim 1, wherein the computer-implemented method further comprises:

identifying a source location of the access request, wherein the source location is the physical geographic location; and allowing or denying the network-enabled device access to the network based on at least one user profile policy associated with the user profile created and at least one physical geographic location policy associated with the physical geographic location, the identifying and allowing enabling roaming of the network-enabled device across a plurality of network with secure network access, the plurality of networks including the network.

10. A system for providing secure network access to network-enabled devices, the system comprising:

at least one processor; and at least one memory, the at least one memory having encoded thereon a sequence of instructions which, when loaded and executed by the at least one processor, causes the at least one processor to:

create a user profile, automatically, the user profile bound to a physical geographic location, the user profile providing access rights to a network segregated into a plurality of Virtual Local Area Networks (VLANs);

exclusively assign, automatically, at least one Virtual Local Area Network (VLAN) to the user profile created, the assigning based on whether there is an existing user profile bound to the physical geographic location; and associate, automatically, the user profile created with a network-enabled device, the assigning and associating providing the network-enabled device with secure network access to the network.

11. The system of claim 10, wherein the system is a cloud-based authentication system.

12. The system of claim 10, wherein the physical geographic location is associated with a given VLAN, designated as a personal area network (PAN), and wherein, in an event there is no existing user profile bound to the physical geographic location, the sequence of instructions further causes the at least one processor to assign the given VLAN to the user profile created.

13. The system of claim 10, wherein the network-enabled device is a type of device that offers an authentication method via a user interface (UI) or is a headless computing device (HCD) that operates without a respective UI and does not offer a respective authentication method, and wherein, in an event there is an existing user profile bound to the physical geographic location, the existing user profile has a first dynamic VLAN exclusively assigned thereto and the at least one VLAN, assigned to the user profile created, includes at least one second dynamic VLAN, the at least one second dynamic VLAN being different from the first dynamic VLAN.

14. The system of claim 10, wherein to assign the at least one VLAN to the user profile created, the system is further configured to associate the at least one VLAN with a media access control (MAC) address of the network-enabled device, embedded identity document (EID) corresponding to an embedded subscriber identity module (eSIM) of the network-enabled device, or other unique identifier of the network-enabled device.

15. The system of claim 10, wherein the system is further configured to:

instruct infrastructure equipment to accept a request for the network-enabled device to attach to the network; and provide a VLAN of the at least one VLAN to the infrastructure equipment.

16. The system of claim 15, wherein the system if further configured to provide attributes to the infrastructure equipment, wherein the attributes include a bandwidth restriction, data usage restriction, session-timeout information, and other attribute, or a combination thereof.

17. The system of claim 15, wherein the physical geographic location is associated with a given VLAN, designated as a PAN, and wherein the VLAN provided is the given VLAN in an event (i) the network-enabled device has no user profile association prior to the associating and (ii) there is only one user profile bound to the physical geographic location.

18. The system of claim 15, wherein, in an event there is an existing user profile bound to the physical geographic location, the at least one VLAN assigned includes a first VLAN and a second VLAN, and wherein, in an event a) the network-enabled device has no user profile association prior to the associating and b) there is more than one user profile bound to the physical geographic location, the VLAN provided is the second VLAN, the second VLAN being different from the first VLAN.

19. The system of claim 10, wherein the system is further configured to:

identify a source location of the access request, wherein the source location is the physical geographic location; and allow or deny the network-enabled device access to the network based on at least one user profile policy associated with the user profile created and at least one physical geographic location policy associated with the physical geographic location, the identifying and allowing enabling roaming of the network-enabled device across a plurality of network with secure network access, the plurality of networks including the network.

* * * * *